United States Patent Office 2,824,879
Patented Feb. 25, 1958

2,824,879
NOVEL VINYL DERIVATIVE

Arthur Ferguson McKay, Pointe Claire, Quebec, and Maria-Elisabeth Kreling, Montreal, Quebec, Canada, assignors to Monsanto Canada Limited, Quebec, Quebec, Canada No Drawing. Application June 4, 1957
Serial No. 663,352

Claims priority, application Great Britain July 28, 1956

2 Claims. (Cl. 260—309.6)

This invention relates to a novel vinyl derivative and polymer thereof.

According to the present invention there is provided 1-vinyl-2,3,5,6-tetrahydro-1-imidaz (1,2a) imidazole of the structural formula

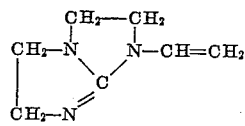

According to a further feature of the present invention the said vinyl derivative is prepared by reacting the compound of the formula.

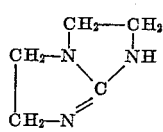

with ethylene oxide to produce the 1-hydroxyethylated derivative thereof, forming the hydrochloride salt of the product, chlorinating it by treatment with thionyl chloride and finally dehydrochlorinating the product by treatment with alcoholic alkali hydroxide.

In the preferred method of carrying out the process, a solution of 2,3,5,6-tetrahydro-1-imidaz (1,2a) imidazole in solvent, suitably methanol, is reacted with ethylene oxide, preferably at or near reflux temperature, for about 2 hours. The solvent can then be removed under reduced pressure and the product, the 1-(β-hydroxyethyl)-heterocycle, recovered by distillation, also under vacuum.

The β-hydroxyethyl derivative obtained, redissolved in a solvent, for example methanol, is then converted to the hydrochloride salt by treatment with methanolic hydrogen chloride, from which the hydrochloride can be recovered by solvent evaporation.

The hydrochloride, a viscous oil, is then dissolved in chloroform containing thionyl chloride, the mixture heated for about two hours at or near reflux temperature, and then evaporated to dryness in vacuo. The residue is dissolved in methanol and treated with a solution of methanolic potassium hydroxide by heating the mixture at or near reflux temperature for about three hours. The precipitated potassium chloride is filtered off, and the solvent removed in vacuo leaving the final product, 1-vinyl-2,3,5,6-tetrahydro-1-imidaz (1,2a) imidazole, in the form of a pale yellow oil.

If desired, the product can be purified by vacuum distillation to a colourless, mobile, liquid, B. P. 84–85° C. at 0.25 mm. Hg.

The process will be more fully understood by reference to the following flow chart in which R represents:

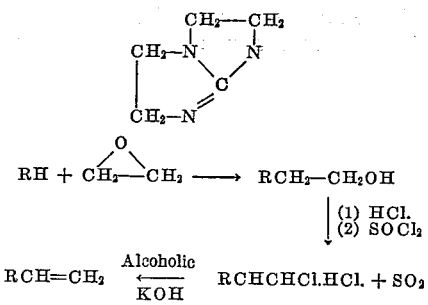

The vinyl derivative of the present invention can be used in the preparation of a polymer by procedures well known to the art, for instance by prolonged heating in an inert atmosphere in the presence of a small amount of a free radical type catalyst, such as lauroyl peroxide, or an ionic type catalyst, for example sodium.

The polymer can be copolymerized with other monomers, for example acrylonitrile, to improve the dyeing properties of the latter. The basic vinyl compound may form 0.5 to 12% of the total polymer for this purpose.

The following example will serve to illustrate the invention:

*Example*

Seventy-five parts by weight of 2,3,5,6-tetrahydro-1-imidaz (1,2a) imidazole was dissolved in 150 parts of methanol. This solution was cooled to 0° C. and then mixed with a solution of 32.7 parts of ethylene oxide in 50 parts of methanol. The final solution was brought to reflux temperature within thirty minutes and refluxing was maintained for one and a half hours. After the solvent was removed, in vacuo under nitrogen, the semi-crystalline residue (B. P. 135° C./0.2 mm. Hg) was distilled in vacuo, yield 75.1 parts (72.2%).

The crystalline solid melted around 60° C. It was purified by crystallizing from ethyl acetate (4.5 cc./g.). This sample of pure 1-(β-hydroxyethyl)-2,3,5,6-tetrahydro-1-imidaz (1,2a) imidazole (M. P. 68.5–69.5° C.) on analysis gave 54.13% carbon; 8.46% hydrogen and 26.83% nitrogen compared with the theoretical calculated for $C_7H_{13}N_3O$ of 54.16% carbon; 8.44% hydrogen; and 27.06% nitrogen.

Thirty parts by weight of 1-(β-hydroxyethyl)-2,3,5,6-tetrahydro-1-imidaz (1,2a) imidazole were dissolved in 50 parts of methanol and this solution was treated with 119 parts of 1.77 N methanolic hydrogen chloride solution. Evaporation of the solution, in vacuo under nitrogen, gave 37 parts (100%) of slightly yellow viscous oil. This oil was dissolved in 100 parts of freshly distilled chloroform containing 29.7 parts of freshly distilled thionyl chloride. The mixture was refluxed for two hours after which the solution was evaporated to dryness, in vacuo. The residue (39.5 parts) was dissolved in 100 parts of absolute methanol and a solution of 21 parts of potassium hydroxide in methanol was added. This solution was refluxed for three hours and the precipitated potassium chloride was removed by filtration. Removal of the solvent, in vacuo, gave 20.3 parts by weight of yellow oil. This oil was purified by distillation, in vacuo.

The fraction (67%) boiling at 84–85° C. at 0.25 mm. Hg was a colourless, mobile oil. It decolorized bromine and potassium permanganate solutions.

This new compound on analysis gave 60.93% carbon; 8.09% hydrogen; and 30.83% nitrogen compared with the theoretical calculated for $C_7H_{11}N_3$ of 61.29% carbon; 8.08% hydrogen; and 30.63% nitrogen. Its picrate (M. P. 170–171° C.) prepared in aqueous solution on analysis gave 42.94% carbon; 3.91% hydrogen; and 23.06% nitrogen compared with the theoretical calculated for $C_{13}H_{14}N_6O_7$ of 42.63% carbon; 3.88% hydrogen; and 22.94% nitrogen.

We claim:

1. 1-vinyl-2,3,5,6-tetrahydro-1-imidaz (1,2a) imidazole of the structural formula:

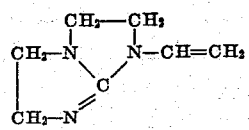

2. A process for preparing the compound defined in claim 1, wherein 2,3,5,6-tetrahydro-1-imidaz (1,2a) imidazole is successively hydroxyethylated in the 1-position with ethylene oxide, converted to the hydrochloride salt, chlorinated with thionyl chloride, and finally dehydrochlorinated with alcoholic alkali hydroxide.

References Cited in the file of this patent
UNITED STATES PATENTS
2,782,205   McKay et al. _____ Feb. 19, 1957